United States Patent
Tourn

(10) Patent No.: US 10,800,520 B2
(45) Date of Patent: Oct. 13, 2020

(54) AVIATION DEVICE COMPRISING A BEARING STRUCTURE AND A ROTATING MEMBER EQUIPPED WITH FIXING MEANS WHICH MAKE IT POSSIBLE TO FIX AT LEAST ONE BLADE

(71) Applicant: Jean-Claude Tourn, Monaco (MC)

(72) Inventor: Jean-Claude Tourn, Monaco (MC)

(*) Notice: Subject to any disclaimer, the term of this patent is extended or adjusted under 35 U.S.C. 154(b) by 241 days.

(21) Appl. No.: 15/547,757

(22) PCT Filed: Feb. 5, 2016

(86) PCT No.: PCT/EP2016/052561
§ 371 (c)(1),
(2) Date: Jul. 31, 2017

(87) PCT Pub. No.: WO2016/128330
PCT Pub. Date: Aug. 18, 2016

(65) Prior Publication Data
US 2018/0022450 A1    Jan. 25, 2018

(30) Foreign Application Priority Data
Feb. 13, 2015 (MC) .......................................... 2608

(51) Int. Cl.
*B64C 27/82* (2006.01)
*B64C 27/12* (2006.01)
*B64C 27/18* (2006.01)

(52) U.S. Cl.
CPC .............. *B64C 27/82* (2013.01); *B64C 27/12* (2013.01); *B64C 27/18* (2013.01); *B64C 2027/8245* (2013.01)

(58) Field of Classification Search
CPC . B64C 2027/8245; B64C 27/12; B64C 27/15; B64C 27/18; B64C 27/06; B64C 27/82
See application file for complete search history.

(56) References Cited

U.S. PATENT DOCUMENTS 2,437,700 A * 3/1948 MacFarland, Jr. ...... B64C 11/48
416/129
2,509,359 A * 5/1950 Margolis ................. F02K 7/005
60/39.35

(Continued)

FOREIGN PATENT DOCUMENTS

CH              260009 A     2/1949
DE    20 2007 006976 U1    9/2008
(Continued)

OTHER PUBLICATIONS

Notice of Allowance and Fee(s) Due for U.S. Appl. No. 12/670,572 (dated Mar. 4, 2014).

(Continued)

*Primary Examiner* — Medhat Badawi
(74) *Attorney, Agent, or Firm* — Jenkins, Wilson, Taylor & Hunt, P.A.

(57) ABSTRACT

The present invention relates to a device for controlling the yaw of an aviation device, such as a helicopter, said aviation device comprising a bearing structure and a rotating member connected to the bearing structure to be mobile in rotation, around an axis of rotation, relative to said bearing structure, wherein the rotating member comprises fixing means for fixing at least one blade, the yaw control device comprising a rotor and a stator which form, in combination, an electrical machine, wherein the bearing structure is connected to the first of this stator and this rotor, and wherein the rotating member is connected to the second of this stator and this rotor, wherein the electrical machine is suitable for generating an electromotive force applied to the rotating member.

8 Claims, 3 Drawing Sheets

(56) References Cited

U.S. PATENT DOCUMENTS

| | | | | |
|---|---|---|---|---|
| 2,667,226 A * | 1/1954 | Doblhoff | B64C 27/18 | 416/20 R |
| 2,814,349 A * | 11/1957 | Berry | B64C 27/18 | 416/21 |
| 2,894,589 A * | 7/1959 | Ehrich | B64C 27/18 | 416/21 |
| 3,032,120 A * | 5/1962 | Lee | B64C 27/18 | 416/21 |
| 3,116,040 A * | 12/1963 | Petrides | B64C 27/18 | 244/17.13 |
| 3,176,413 A * | 4/1965 | Dornier | G09B 9/46 | 434/33 |
| 3,768,926 A * | 10/1973 | Pegg | F02K 7/04 | 416/21 |
| 3,792,827 A * | 2/1974 | Girard | B64C 27/026 | 244/7 A |
| 3,930,625 A * | 1/1976 | Krivka | B64C 27/08 | 244/17.21 |
| 4,589,611 A * | 5/1986 | Ramme | B64C 27/10 | 244/12.3 |
| 4,893,656 A * | 1/1990 | Willhoft | B65G 53/56 | 137/625.4 |
| 5,149,014 A * | 9/1992 | Faller | B64C 27/18 | 244/17.11 |
| 5,454,530 A * | 10/1995 | Rutherford | B64C 27/24 | 244/22 |
| 5,516,060 A * | 5/1996 | McDonnell | B64C 29/02 | 244/207 |
| 5,765,776 A * | 6/1998 | Rogers | B64C 39/064 | 244/12.2 |
| 5,788,181 A * | 8/1998 | Wilson | B64C 27/18 | 239/265.43 |
| 5,842,665 A * | 12/1998 | McKinney | B64C 27/18 | 244/2 |
| 5,984,635 A * | 11/1999 | Keller | B63H 11/12 | 244/17.11 |
| 6,131,849 A * | 10/2000 | Nyhus | B64C 27/18 | 244/17.11 |
| 6,709,023 B2 * | 3/2004 | French | F16L 27/06 | 285/223 |
| 6,789,764 B2 * | 9/2004 | Bass | B64C 27/08 | 244/10 |
| 6,885,917 B2 * | 4/2005 | Osder | B64C 27/18 | 244/10 |
| 7,014,142 B2 * | 3/2006 | Barocela | B64C 3/50 | 244/7 R |
| 7,275,711 B1 * | 10/2007 | Flanigan | B64C 27/18 | 244/17.11 |
| 7,600,711 B1 * | 10/2009 | Nyhus | B64C 3/385 | 244/7 A |
| 7,624,942 B2 * | 12/2009 | Roberge | B64C 27/24 | 244/62 |
| 7,766,274 B1 * | 8/2010 | Jameson | B64C 39/024 | 244/137.1 |
| 8,011,614 B2 * | 9/2011 | Bird | B64C 27/18 | 244/12.2 |
| 8,757,536 B2 | 6/2014 | Tourn | | |
| 8,931,728 B1 * | 1/2015 | van der Westhuizen | B64C 27/18 | 244/17.11 |
| 8,939,725 B2 * | 1/2015 | Lading | B64C 27/52 | 415/80 |
| 8,991,748 B1 * | 3/2015 | van der Westhuizen | B64C 27/18 | 244/17.11 |
| 9,038,940 B1 * | 5/2015 | van der Westhuizen | B64C 27/18 | 244/17.11 |
| 9,073,631 B1 * | 7/2015 | van der Westhuizen | B64C 27/48 | |
| 9,315,264 B2 * | 4/2016 | Zhu | B64C 27/467 | |
| 9,527,577 B2 * | 12/2016 | Embacher | B64C 5/16 | |
| 9,545,903 B2 * | 1/2017 | Rehfus | B60T 7/12 | |
| 10,131,425 B2 * | 11/2018 | Certain | B64C 27/82 | |
| 2004/0000614 A1 * | 1/2004 | Leyva | B64C 27/18 | 244/17.11 |
| 2010/0252673 A1 * | 10/2010 | Tourn | B64C 27/18 | 244/17.11 |

FOREIGN PATENT DOCUMENTS

| | | |
|---|---|---|
| EP | 2 181 036 B1 | 11/2012 |
| GB | 612189 A | 11/1948 |
| GB | 2 320 477 A | 6/1998 |
| GB | 2 360 752 A | 10/2001 |
| WO | WO 2009/044013 A2 | 4/2009 |

OTHER PUBLICATIONS

Non-Final Official Action for U.S. Appl. No. 12/670,572 (dated May 10, 2013).
Advisory Action for U.S. Appl. No. 12/670,572 (dated Feb. 8, 2013).
Final Official Action for U.S. Appl. No. 12/670,572 (dated Nov. 6, 2012).
Non-Final Official Action for U.S. Appl. No. 12/670,572 (dated Apr. 18, 2012).
International Search Report for International Application No. PCT/FR2008/001104 (dated Jul. 29, 2009).
"Kamov Ka-26," Wikipedia, pp. 1-6 (Publication date unknown).
"Tandem Rotors," Wikipedia, pp. 1-3 (Publication date unknown).
"Kaman K-MAX," Wikipedia, pp. 1-4 (Publication date unknown).
International Search Report and Written Opinion for International Patent Application No. PCT/EP2016/052561 (dated May 10, 2016).

* cited by examiner

AVIATION DEVICE COMPRISING A BEARING STRUCTURE AND A ROTATING MEMBER EQUIPPED WITH FIXING MEANS WHICH MAKE IT POSSIBLE TO FIX AT LEAST ONE BLADE

PRIORITY CLAIM

This application claims the benefit of International Patent Application No. PCT/EP2016/052561, filed Feb. 5, 2016, which claims the benefit of Monaco Patent Application No. 2608, filed Feb. 13, 2015, the disclosure of each of which is incorporated herein by reference in its entirety.

FIELD OF THE INVENTION

The present invention relates to an aviation device for controlling the yaw of an aviation device, such as a helicopter.

PRIOR ART

Aviation devices, such as helicopters, are already known in the prior art and are equipped with a structure forming the cabin of said helicopter. The structure is suitable for receiving, in its interior, means for rotating a rotating member comprising, in particular, blades. A helicopter is also equipped, at its end, with a tail generally equipped with a tail rotor or anti-torque rotor which makes it possible to control the yaw of said helicopter.

In the prior art, it is known to use a first type of helicopter wherein the blades are rotated by means of a motor comprising a substantially vertical main axis, during normal use. This substantially vertical main axis is connected to a motor which is suitable for generating the rotation of said main axis. Such a rotation generates a torque on the structure of the helicopter. During use, the helicopter uses its tail rotor to compensate for the torque induced by the action of the motor and ensure control of said helicopter when it is moving. The tail rotor thus prevents the helicopter from pivoting on itself when the blades are rotating and ensures control of the yaw of the helicopter.

The prior art discloses other types of helicopters comprising alternative solutions for compensating for the presence of a torque and linking the blades with the main axis of the structure onto which the blades are fixed.

Thus, the manufacturer KAMOV suggests a first solution according to which the aviation device uses two coaxial lift rotors which pivot in opposite directions. The torque created with the aim of pivoting the first rotor in a first direction is neutralised by the torque created with the aim of pivoting the second rotor in the opposite direction.

The manufacturer PIASEKI discloses a second solution which makes it possible to avoid creating a moment on the cabin of the helicopter and to use two rotors "in tandem". This signifies that the helicopter is equipped with a first rotor which turns in a first direction and which is positioned at the front end of the helicopter, and with a second rotor which turns in the opposite direction and which is positioned at the rear end of the helicopter. The two rotors therefore operate in opposite rotation directions.

Other solutions are also known from the prior art and disclose a solution wherein the rotation of the blades does not result in movement on the structure of the helicopter. Indeed, the principle of this solution consists in using hollow blades which, at their ends, are equipped with orifices which allow the evacuation of a quantity of compressed air. The compressed air thus evacuated exerts a force on the blades which then start to rotate relative to the helicopter cabin.

European patent application No. EP 2181036, filed by the same applicant, discloses a special system comprising a structure and a rotating member capable of pivoting relative to said structure, and wherein the rotating member comprises blades and motor arms. The motor arms include hollow tubes equipped, at their ends, with orifices which allow the evacuation of a pressurised gas. According to European patent application No. EP 2181036, the motor arms are connected, at the exit, to a gas turbine. The gas turbine, positioned substantially vertically in the axis of rotation of the blades, allows the evacuation, at its end, of a quantity of hot pressurised gas. The turbine exit is connected to at least two motor arm entries by means of a "Y"-shaped member. The rotating member thus pivots about an axis of rotation, the motor arm entry being directly connected to the gas turbine exit. This system allows a transfer of the pressurised gases from the gas turbine toward the motor arms, and does this with minimal loss.

The system for propelling the blades relative to a structure of the type disclosed within the European patent application No. EP 2181036 makes it possible to produce a helicopter with the aid of a relatively simple construction, including relatively non-complex adjustment means. Amongst other things, the helicopter may fly without requiring a tail rotor. Indeed, the rotating of the blades does not generate the creation of a moment on the structure. Nevertheless, it would appear necessary to control the yaw under certain circumstances, for example during daily use of a helicopter which uses the system disclosed within European patent application No. EP 2181036. Indeed, in practice, despite the absence of moment during the rotation of the blades, the presence of a friction force between the different connections, in particular in the ball bearings, may generate a structure-disrupting rotation during helicopter flight.

It thus proves necessary to develop a system for an aviation device in order to control the yaw of said aviation device, and without necessitating the presence of a tail rotor or of an anti-torque rotor.

OBJECT OF THE INVENTION

With reference to the observations above, the aim of the present invention consists of proposing a device for controlling the yaw of an aviation device, such as a helicopter, wherein said yaw being may be controlled easily.

More precisely, the object of the invention is a device for controlling the yaw of an aviation device, such as a helicopter, said aviation device comprising a bearing structure and a rotating member connected to said bearing structure to be mobile in rotation, around an axis of rotation, relative to said bearing structure, wherein the rotating member comprises fixing means for fixing at least one blade, the yaw control device comprising a rotor and a stator which form, in combination, an electromagnetic-type motor, wherein the bearing structure is connected to the first of this stator and this rotor, and wherein the rotating member is connected to the second of this stator and this rotor, wherein the electromagnetic-type motor is suitable for generating an electromotive force applied to the rotating member.

The present description refers to an electromagnetic-type motor. In the context of the present patent application, the expression "electrical machine" or "electromagnetic-type motor" refers to an electromagnetic device based on electromagnetism and which enables the conversion of electrical energy into mechanical energy. This process, which is reversible, may be used to produce electricity. Regarding the present patent application, reference is made to a reversible system capable of behaving in either "motor" mode or "generator" mode.

According to one embodiment of the invention the electrical machine is a direct-current motor.

According to one embodiment of the invention the electrical machine is a brushless direct-current motor.

According to one embodiment of the invention, the structure is connected to the stator and the rotating member is connected to the rotor of the electrical machine.

According to one embodiment of the invention, the electrical machine is positioned about the axis of rotation of the rotating member.

According to one embodiment of the invention, the electrical machine is positioned at a distance from the axis of rotation of the rotating member, said rotating member being connected to the rotor of the electrical machine with the aid of a transmission member such as a belt.

According to one embodiment of the invention, the electrical machine is connected to a source of electrical energy suitable for recovering the mechanical energy resulting from the inertia of the mobile in the form of electrical energy.

According to one embodiment of the invention, the electrical machine is connected to an electronic control system which makes it possible to operate said electrical machine either in "motor" mode or "generator" mode.

BRIEF DESCRIPTION OF THE DRAWINGS

The aims, objects and characteristics of the present invention, as well as the advantages thereof, will appear more clearly from reading the description below, of the preferred embodiments of a device for controlling the yaw of an aviation device, with reference to the drawings wherein:

FIG. 1 shows a rotating member 1 fixed to the upper part of a bearing structure 2 of an aviation device such as a helicopter. The rotating member 1 can pivot relative to said bearing structure 2 with the aid of a transmission system (not shown) which allows the production of a pressurised gas. The pressurised gas penetrates inside an aperture 3 directly connected to the exit of a gas turbine (not shown). The pressurised gas circulates within a "Y"-shaped member, as also shown in FIGS. 2 and 3, from the entry 3 in the direction of an exit 4 connected to the entry of a motor arm. The motor arm takes the form of a tube which is equipped with an orifice at its end which permits the evacuation of the pressurised gas in a specific direction. The "Y"-shaped member 5 comprises two distinct exits 4 positioned at an angle of 180° opposite one another even though one single exit 4 is visible on FIG. 1. The connections between the rotating member 1 and the bearing structure 2 are made, in particular, with the aid of ball bearings (not shown). After being made to rotate, the rotating member 1 is capable of receiving blades (not shown) which are fixed onto said rotating member 1 by means of a fixing member 6. The blade is fixed to the fixing member 6 shown in detail in FIGS. 2 and 3. For reasons of clarity, just one fixing member 6 is represented in FIGS. 1, 2 and 3. In practice, a first blade is fixed on the end of a first fixing member 6 and a second blade is fixed on the end of a second fixing member 6. For reasons of clarity, the various figures show just one fixing member 6.

By using a pressurised gas circulating from the aperture 3 towards the exits 4, the rotating member 1 is made to rotate relative to the bearing structure 2 without any torque being generated on said bearing structure 2. In other words, the use of the control device according to FIG. 1 on the helicopter does not require the presence of a tail rotor or an anti-torque rotor in order to neutralise any torque which results in the rotating member being rotated.

Nevertheless, it would appear necessary to control the yaw under certain circumstances. Indeed, in practice, despite the absence of moment during the rotation of the blades, the presence of a friction force between the different connections, in particular in the ball bearings, may generate a structure-disrupting rotation during helicopter flight.

Figure 1:
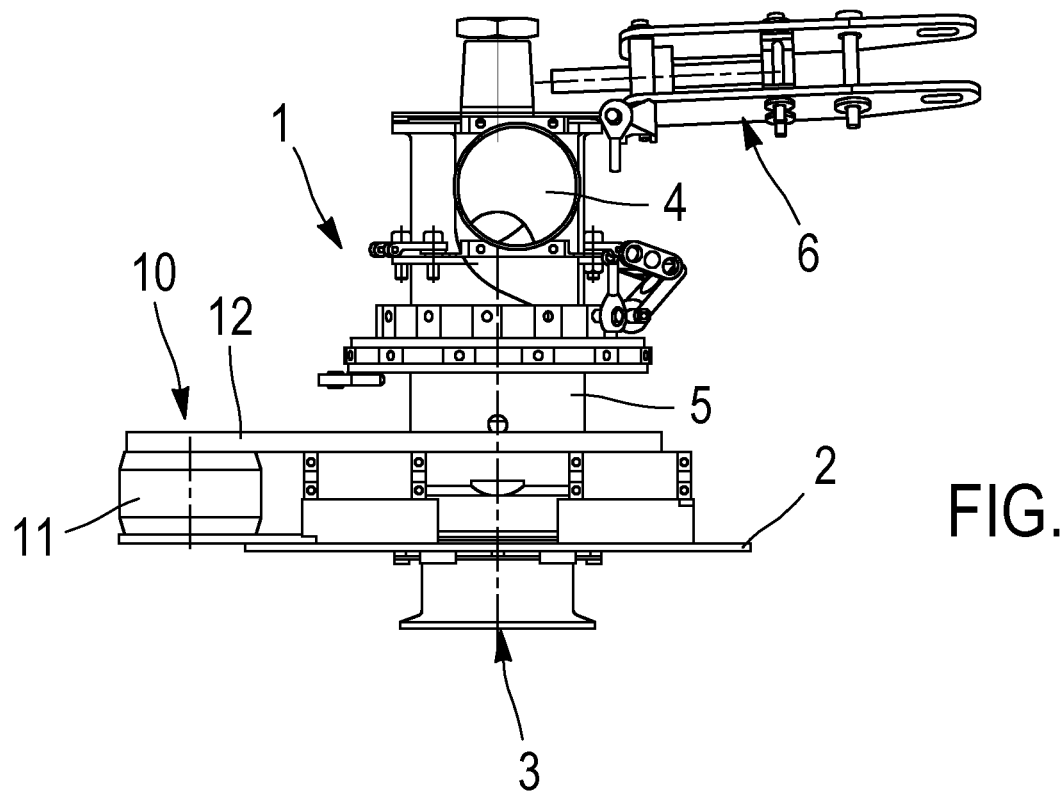
FIG. 1 shows a front view of a first embodiment of a system for controlling the yaw of an aviation device according to the invention.

In order to control the yaw of the aviation device, FIG. 1 shows a yaw control device 10. The yaw control device 10 comprises an electrical machine comprising a rotor (not shown) and a stator (not shown). According to the embodiment represented in FIGS. 1 and 2, the stator of the electrical machine 11 is fixed onto the bearing structure 2. The rotor is connected to the rotating member 1 by means of a transmission member such as a belt 12. In other words, the use of the electrical machine 11 makes it possible to exert a force on the rotating member 1, and does so with the aim of possibly correcting the yaw between said rotating member 1 and the bearing structure 2. The electrical machine 11 is preferably a reversible-type machine capable of acting as either a "motor" or as a "generator". When the electrical machine 11 operates in "motor" mode, i.e. with the aid of an electrical energy source, said electrical machine may be used with the aim of correcting the yaw between the rotating member 1 and the bearing structure 2 in a first direction. When the electrical machine is used to brake the rotation of the rotating member 1 relative to the bearing structure 2, said machine may produce, by means of operation in "generator" mode, electrical energy which can be transferred to an energy storage device such as a battery. Furthermore, the yaw can be corrected in a second direction.

The technical effect of the use of an electrical machine between the rotating member 1 and the bearing structure 2 is that the stator can generate a force on said bearing structure 2 in two opposite directions depending on the use of the electrical machine, either in "generator" mode or in "motor" mode. This signifies that, in "generator" mode, the stator brakes the rotor and, as a consequence, the stator and rotor assembly exerts a force, in a first direction, on the rotor relative to the stator and the bearing structure onto which the stator is fixed. This first direction is the direction of rotation of the blades.

In "motor" mode, the stator rotates the rotor and, as a consequence, the stator and rotor assembly exerts a force, in a second direction opposite to the first direction, on the rotor relative to the stator and the bearing structure onto which the stator is fixed. This second direction is the opposite direction to the direction of rotation of the blades.

The force generated on the bearing structure 2 can thus neutralise any residual torque between the rotating member 1 and the bearing structure 2 during the rotation of said rotating member 1 relative to the bearing structure 2.

The electrical machine 11 may be, for example, a direct-current machine made up of a stator and a rotor. The stator creates a fixed longitudinal magnetisation with the aid of a winding or permanent magnets. The rotor is made up of an assembly of coils linked to a rotary collector. The rotary collector makes it possible to keep the transverse direction of the magnetisation of a rotor fixed when this turns. By means of this device, the rotor and stator magnetisations are always optimally offset. This offset brings about a torque in accordance with the maximum flux principle, which means that a north pole exerts an attraction on a south pole, thus causing the motor to rotate.

One of the main advantages of a direct-current motor is the simplicity of its adaptation to means which make it possible to adjust or vary the speed of said direct-current motor, the torque and the direction of rotation, or even direct connection to the energy source such as batteries, storage devices, cells, etc.

Within the present invention, the electrical machine 11 comprises a "brushless" direct-current motor of which the rotor is made up of one or more permanent magnets and equipped with a rotary position sensor known as a "Hall effect sensor". An electronic control system (not shown) can ensure the communication of the current in the stator winding, by being built into the motor or present outside the motor. The electronic control system makes it possible to ensure the auto-piloting of the motor, i.e. maintaining the orthogonality of the rotor magnetic flux relative to the stator flux.

A direct-current brushless motor operates in "motor" mode when the energy received comes from an electricity source. A direct-current brushless motor operates in "generator" mode if the driving means are mechanical. The "generator" mode or dynamo is used once the electrical machine 11 is used to brake the rotation of the rotating member 1 relative to the bearing structure 2.

Figure 2:
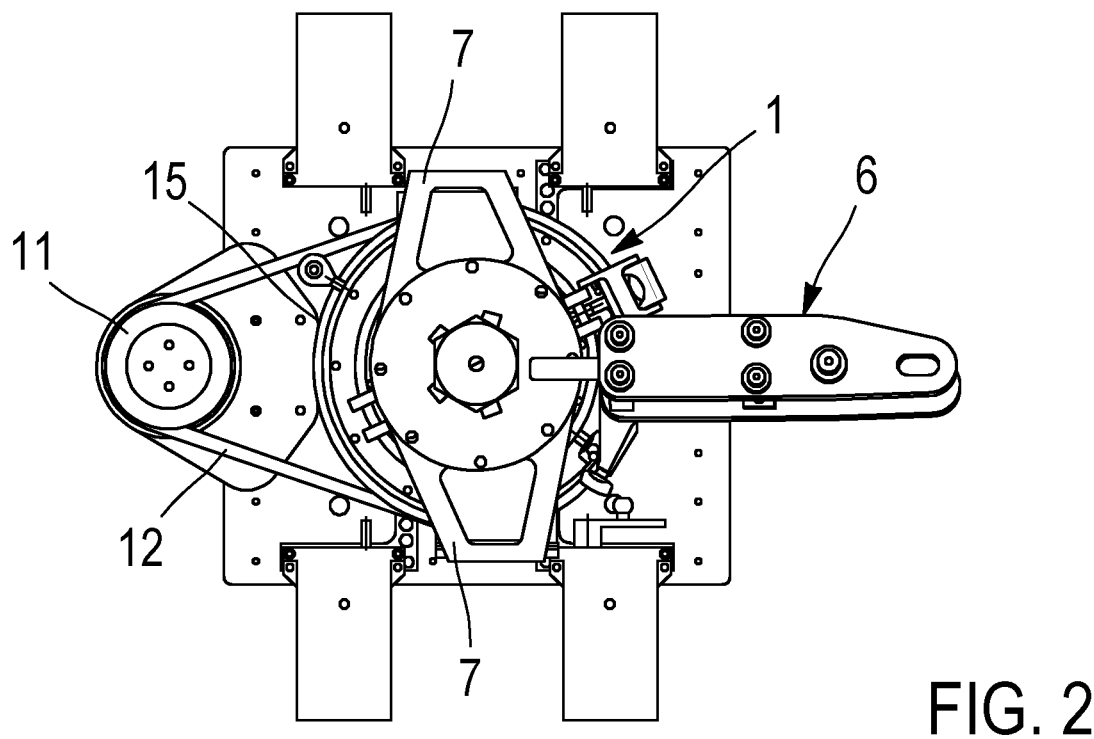
FIG. 2 represents a top view of a first embodiment according to FIG. 1.

FIG. 2 represents a top view of the assembly from FIG. 1. FIG. 2 shows the rotating member 1 equipped, at its upper end, with the fixing member 6 for fixing a blade. The two motor arms are fixed on members 7 positioned with an offset of 180°, each of said members being suitable for receiving the entry of a motor arm and fixing said entry directly onto the exit of the "Y"-shaped member 5 as shown in FIG. 1. FIG. 2 shows the use of the belt 12 between the electrical machine 11 and a disc 15 which is part of the rotating member 1.

Figure 3:
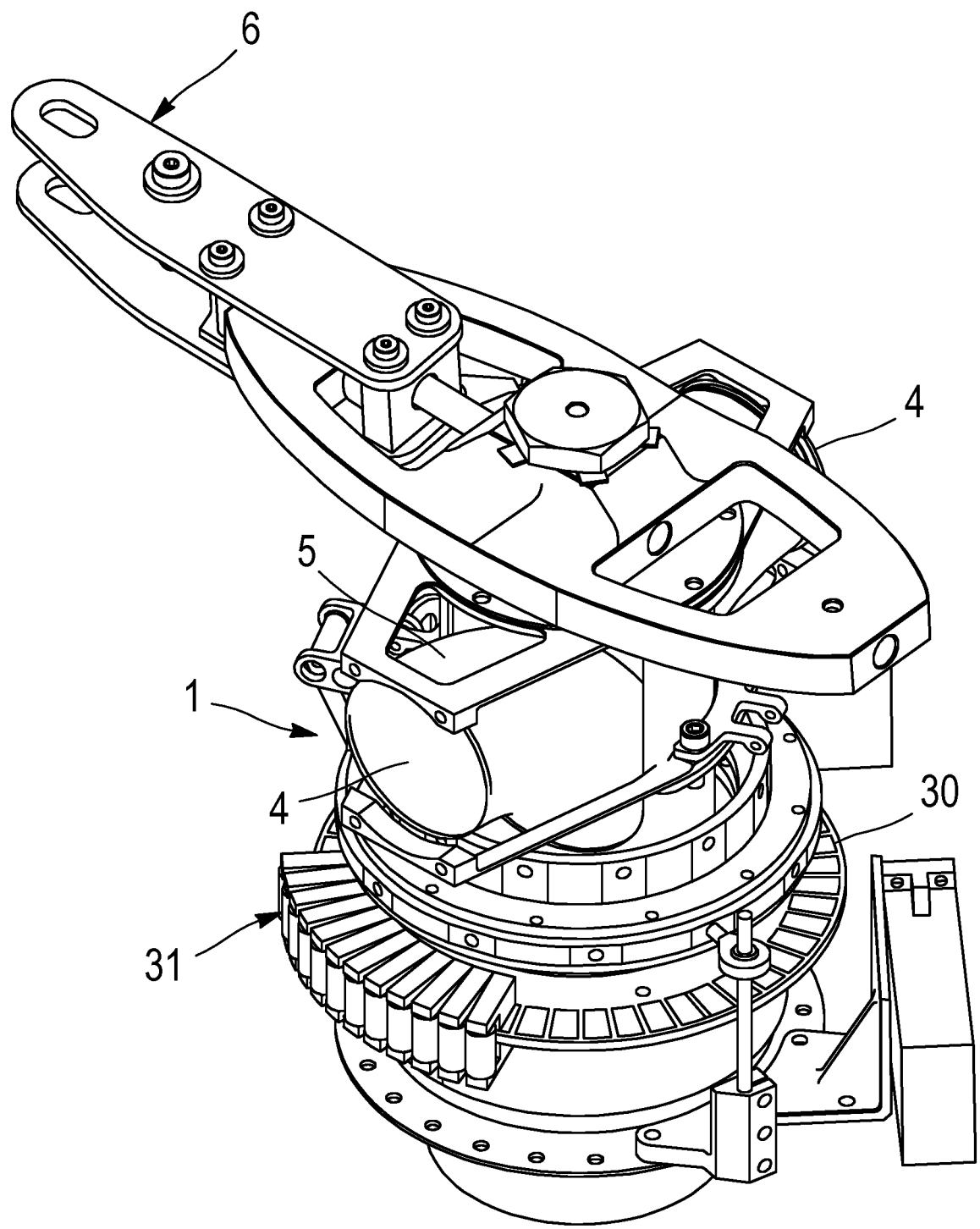
FIG. 3 shows a perspective view of a second embodiment of a system for controlling the yaw of an aviation device according to the invention.

FIG. 3 shows a second embodiment of the device for controlling the yaw of an aviation device according to the invention. FIG. 3 represents the rotating member 1 equipped, at its end, with a fixing member 6 for fixing a blade. The "Y"-shaped member 5 is also visible, with a first and a second distinct exit 4 positioned, at an angle of 180°, opposite one another. A rotor 30 is visible on the rotating member 1, said rotor 30 pivoting relative to a series of magnets 31.

According to the embodiment of the invention from FIG. 3, the electrical machine 11 comprising the rotor 30 and the stator 31 is coaxial with the rotating member 1.

Figure 4:
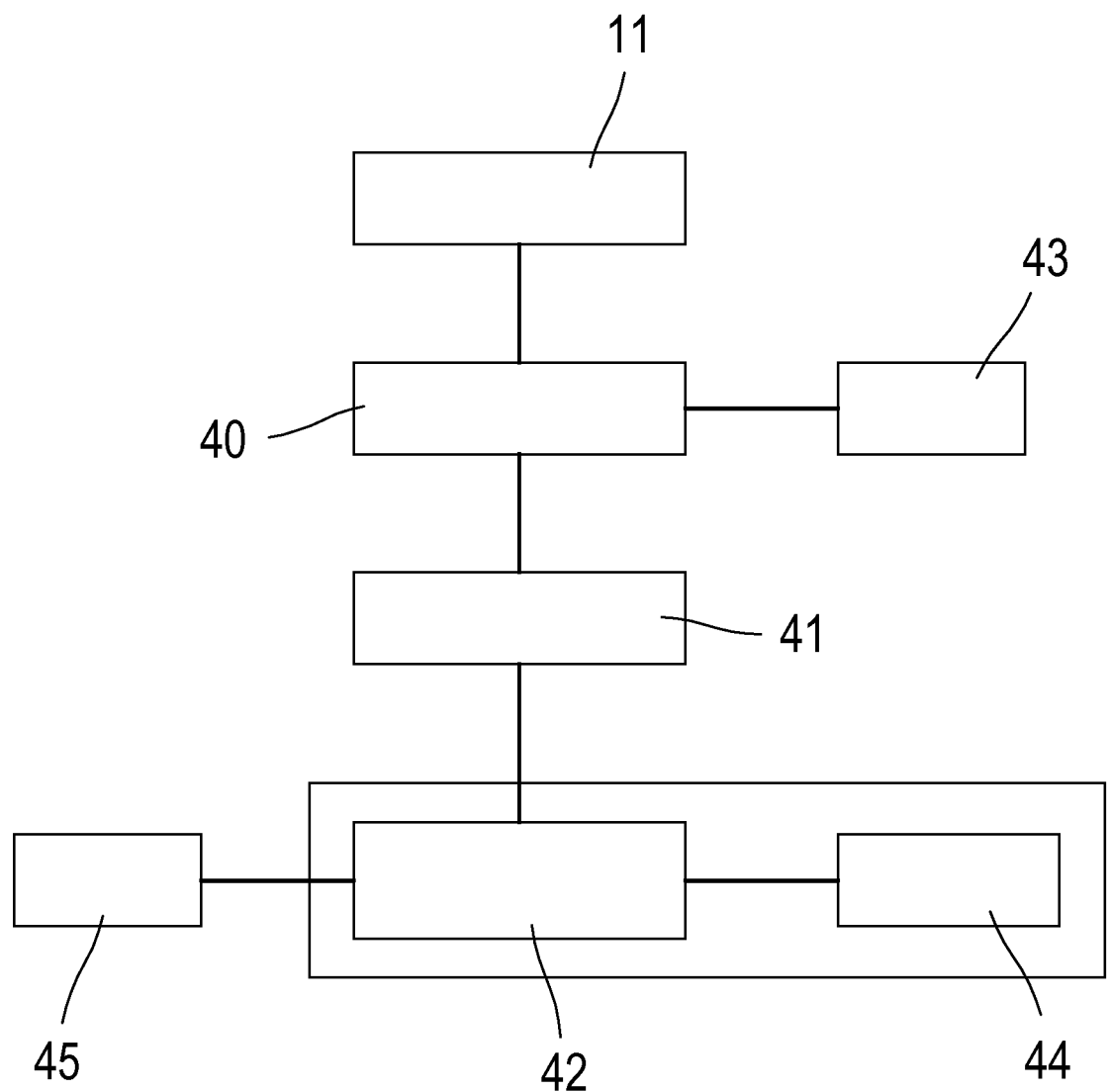
FIG. 4 represents, schematically, the various components of a system for controlling the yaw of an aviation device according to the invention.

FIG. 4 represents, schematically, the various components of the device for controlling the yaw of an aviation device according to the invention. The device comprises an electrical machine 11 connected to a controller 40. The controller 40 is connected to a "control switch" 41 via which the controller 40 is connected to a "locking system" 42. Furthermore, the controller is connected to an electricity source such as a battery 43. The "locking system" 42 is connected to a "gyroscopic sensor" 44 and a "radio-controlled receiver" 45.

The invention claimed is:

1. A device for controlling yaw of an aviation device comprising a helicopter, said aviation device comprising a bearing structure and a rotating member connected to the bearing structure for rotating around an axis of rotation, relative to said bearing structure, wherein the rotating member comprises fixing means for fixing at least one blade, the device for controlling the yaw comprising a stator and rotor assembly including a rotor and a stator which form, in combination, an electrical machine, wherein the electrical machine is connected to the bearing structure and to the rotating member, wherein the electrical machine generates and applies force to the rotating member to correct yaw between the rotating member and the bearing structure, wherein the electrical machine operates in a generator mode in which the stator brakes the rotor and the stator and rotor assembly exerts a force in a first direction on the bearing structure, where the first direction is a direction of rotation of the at least one blade and wherein the electrical machine operates in a motor mode in which the stator rotates the rotor and the stator and rotor assembly exerts a force in a second direction opposite to the first direction on the bearing structure, where the second direction is the direction of rotation of the at least one blade.

2. The device for controlling the yaw of the aviation device, according to claim 1, wherein the electrical machine is a direct-current motor.

3. The device for controlling the yaw of the aviation device, according to claim 2, wherein the electrical machine is a direct-current brushless motor.

4. The device for controlling the yaw of the aviation device, according to claim 1, wherein the bearing structure is connected to the stator and wherein the rotating member is connected to the rotor of the electrical machine.

5. The device for controlling the yaw of the aviation device, according to claim 1, wherein the electrical machine is positioned about the axis of rotation of the rotating member.

6. The device for controlling the yaw of the aviation device, according to claim 1, wherein the electrical machine is positioned at a distance from the axis of rotation of the rotating member, wherein said rotating member is connected to the rotor of the electrical machine with the aid of a transmission member comprising a belt.

7. The device for controlling the yaw of the aviation device, according to claim 1, wherein the electrical machine is connected to a source of electrical power suitable for recovering electrical energy generated from mechanical energy resulting from the inertia of the rotating member that has been converted into the electrical energy.

8. The device for controlling the yaw of the aviation device, according to claim 1, wherein the electrical machine is connected to an electronic control system which enables operation of said electrical machine either in the motor mode or the generator mode.

* * * * *